United States Patent
Xu et al.

(10) Patent No.: US 10,192,571 B2
(45) Date of Patent: *Jan. 29, 2019

(54) PERPENDICULAR MAGNETIC RECORDING MEDIUM AND MAGNETIC RECORDING AND REPRODUCING APPARATUS

(71) Applicant: SHOWA DENKO K.K., Tokyo (JP)

(72) Inventors: Chen Xu, Ichihara (JP); Gohei Kurokawa, Ichihara (JP)

(73) Assignee: SHOWA DENKO K.K., Tokyo (JP)

( * ) Notice: Subject to any disclaimer, the term of this patent is extended or adjusted under 35 U.S.C. 154(b) by 170 days.

This patent is subject to a terminal disclaimer.

(21) Appl. No.: 15/096,351

(22) Filed: Apr. 12, 2016

(65) Prior Publication Data

US 2016/0300591 A1 Oct. 13, 2016

(30) Foreign Application Priority Data

Apr. 13, 2015 (JP) ................. 2015-081658

(51) Int. Cl.
G11B 5/73 (2006.01)
G11B 5/667 (2006.01)
G11B 5/127 (2006.01)

(52) U.S. Cl.
CPC ............ *G11B 5/1278* (2013.01); *G11B 5/667* (2013.01); *G11B 5/732* (2013.01); *G11B 5/7325* (2013.01)

(58) Field of Classification Search
CPC ............ G11B 5/73; G11B 5/732; G11B 5/738
See application file for complete search history.

(56) References Cited

U.S. PATENT DOCUMENTS 7,173,013 B2 * 2/2007 Kolobov ............ A61K 38/05
514/2.4
7,183,013 B2 2/2007 Oikawa et al.
(Continued)

FOREIGN PATENT DOCUMENTS

CN 102576546 A 7/2012
CN 102779532 A 11/2012
(Continued)

OTHER PUBLICATIONS

Communication dated May 3, 2018, from the State Intellectual Property Office of People's Republic of China in counterpart Application No. 201610208270.0.
(Continued)

*Primary Examiner* — Holly C Rickman
(74) *Attorney, Agent, or Firm* — Sughrue Mion, PLLC

(57) ABSTRACT

A perpendicular magnetic recording medium includes a structure in which at least a soft magnetic backing layer, an underlayer, an intermediate layer, and a perpendicular magnetic recording layer are sequentially laminated on a non-magnetic substrate, in which the soft magnetic backing layer includes at least a soft magnetic film having an amorphous structure, the underlayer includes a first underlayer and a second underlayer laminated in this order from the non-magnetic substrate side, the first underlayer is made of a TiV alloy having an amorphous structure, the second underlayer includes a NiW alloy, the intermediate layer includes Ru or a Ru alloy, the soft magnetic film having an amorphous structure directly contacts the first underlayer, and the first underlayer directly contacts the second underlayer.

7 Claims, 1 Drawing Sheet

(56) References Cited

U.S. PATENT DOCUMENTS

| | | | |
|---|---|---|---|
| 8,088,504 B2 | 1/2012 | Shimizu | |
| 8,603,651 B2 | 12/2013 | Takahoshi et al. | |
| 2003/0219630 A1* | 11/2003 | Moriwaki | G11B 5/65 |
| | | | 428/836.2 |
| 2007/0127158 A1* | 6/2007 | Tran | G11B 5/78 |
| 2009/0130346 A1 | 5/2009 | Osawa et al. | |
| 2012/0154948 A1 | 6/2012 | Tamai et al. | |
| 2014/0342189 A1* | 11/2014 | Tachibana | G11B 5/732 |
| | | | 428/831 |

FOREIGN PATENT DOCUMENTS

| | | |
|---|---|---|
| JP | H01-263910 A | 10/1989 |
| JP | 773441 A | 3/1995 |
| JP | 7-244831 A | 9/1995 |
| JP | 2669529 B2 | 10/1997 |
| JP | 2003-123239 A | 4/2003 |
| JP | 204-227717 A | 8/2004 |
| JP | 2004-227717 A | 8/2004 |
| JP | 2007-179598 A | 7/2007 |
| JP | 2007184019 A | 7/2007 |
| JP | 2007-272990 A | 10/2007 |
| JP | 2010-92525 A | 4/2010 |
| JP | 2012-69230 A | 4/2012 |
| JP | 2014241182 A | 12/2014 |
| WO | 2009028621 A1 | 3/2009 |

OTHER PUBLICATIONS

Office Action dated Feb. 26, 2018, which issued during the prosecution of U.S. Appl. No. 15/088,341.
Communication dated Sep. 4, 2018, from the Japanese Patent Office in counterpart application no. 2015-081658 y.

\* cited by examiner

PERPENDICULAR MAGNETIC RECORDING MEDIUM AND MAGNETIC RECORDING AND REPRODUCING APPARATUS

BACKGROUND OF THE INVENTION

Field of the Invention

The present invention elates to a perpendicular magnetic recording medium used in a hard disk drive (HDD) or the like, and a magnetic recording and reproducing apparatus.

Priority is claimed on Japanese Patent Application No. 2015-081658, filed on Apr. 13, 2015, the content of which is incorporated herein by reference.

Description of Related Art

A perpendicular magnetic recording method is, conventionally, a method suitable for improving the surface recording density, since it becomes more magnetostatically stable as the recording density becomes higher, which improves the thermal fluctuation tolerance. This is because by orienting the axis of easy magnetization of the magnetic recording layer, which was oriented in the in-plane direction of the medium, in the perpendicular direction of the medium, the diamagnetic field near the magnetic transition region, which is the border between recording bits, becomes smaller.

A perpendicular magnetic recording medium includes a soft magnetic backing layer (soft underlayer (SUL)), an underlayer, an intermediate layer, and a perpendicular magnetic recording layer sequentially laminated on a non-magnetic substrate. In the case in which the soft magnetic backing layer composed of a soft magnetic material is provided between the non-magnetic substrate and the perpendicular magnetic recording layer, the medium acts as a so-called perpendicular two-layered medium and thus can obtain a high recording capability. At this time, the soft magnetic backing layer plays the role of reversing the line of magnetic force generated from a magnetic head, and thus can improve the recording and reproducing efficiency.

In addition, since the underlayer is a dominant element that determines the particle sizes or orientations of the intermediate layer and the perpendicular magnetic recording layer provided thereon, selection of the material is extremely important in determining the recording and reproducing characteristics of a magnetic recording media. Therefore, various materials that are available for the underlayer are suggested. For example, it is possible to use an hcp-structured material or an fcc-structured material, such as a Ti alloy (for example, refer to Japanese Patent No. 2669529) or a NiFeCr alloy (for example, refer to Japanese Unexamined Patent Application, First Publication No. 2003-123239), or an amorphous structured material, such as Ta. In addition, Japanese Unexamined Patent Application, First Publication No. 2010-92525 describes the use of an alloy including, as the underlayer, one of Ni, Cu, Pt, and Pd as the main component and as additive element, one or more of Ti, V, Ta, Cr, Mo, and W.

It is suggested that Ru be used as an intermediate layer (refer to Japanese Unexamined Patent Application, First Publication No. H07-244831). In addition, it is known that, since Ru has dome-shaped protrusions formed on the top portion of columnar crystals, Ru has an effect of growing the crystal grains of the recording layer or the like on the protrusions, promoting the isolated structure of the grown crystal grains, isolating the crystal grains, and thus growing magnetic particles in a columnar shape (refer to Japanese Unexamined Patent Application, First Publication No. 2007-272990).

In Japanese Unexamined Patent Application, First Publication No. 2012-069230, it is disclosed that a lamination structure of an fcc-structured alloy layer including an fcc-structured element and a bcc-structured element, and a NiW alloy layer is adopted for the underlayer.

In addition, in Japanese Unexamined Patent Application, First Publication No. 2004-227717, it is disclosed that TiV is used for the underlayer of a magnetic recording medium oriented in the in-plane direction.

SUMMARY OF THE INVENTION

The demand for high recording density of a magnetic recording medium is continuously rising, and thus there is demand for a magnetic recording medium which can realize a higher recording density than ever before.

In order to meet the above demand, in the related art, there has been an attempt to provide a perpendicular magnetic recording medium in which, by refining the crystal grains in the underlayer using a NiW alloy, refinement and improved orientation of crystal grains are achieved in the intermediate layer and the magnetic recording layer formed on the underlayer, electromagnetic conversion characteristics are excellent, and a high recording density can be achieved, and a magnetic recording and reproducing apparatus provided with the perpendicular magnetic recording medium. A method of mainly providing an fcc-structured fine crystal layer between a soft magnetic backing layer having an amorphous structure and a NiW underlayer to refine the crystals of the NiW layer has been used in many cases. However, there is a limitation in the attempt and there arises a problem that it is hard to control the orientation of the intermediate layer to be formed on the NiW layer if the crystal grains of the NiW layer are excessively refined.

The present invention has been made in consideration of the above circumstances in the related art and an object of the present invention is to provide a perpendicular magnetic recording medium in which, by providing an underlayer using a NiW alloy layer capable of achieving refinement of crystal grains and high controllability of the crystal orientation of the underlayer, refinement and improved orientation of crystal grains is achieved in an intermediate layer and a recording layer formed on the underlayer, electromagnetic conversion characteristics are excellent, high recording density can be achieved, and a magnetic recording and reproducing apparatus provided with the perpendicular magnetic recording medium.

In order to solve the above problem, the present invention employs the following means.

(1) According to an aspect of the present invention there is provided a perpendicular magnetic recording medium including a structure in which at least a soft magnetic backing layer, an underlayer, an intermediate layer, and a perpendicular magnetic recording layer are sequentially laminated on a non-magnetic substrate, in which the soft magnetic backing layer includes at least a soft magnetic film having an amorphous structure, the underlayer includes a first underlayer and a second underlayer laminated in this order from the non-magnetic substrate side, the first underlayer is made of a TiV alloy having an amorphous structure, the second underlayer includes a NiW alloy, the intermediate layer includes Ru or a Ru alloy, the soft magnetic film having an amorphous structure directly contacts the first underlayer, and the first underlayer directly contacts the second underlayer.

(2) In the aspect stated in the above (1), the perpendicular magnetic recording medium, in which the amount of V included in the TiV alloy may be 10 atom % to 80 atom %.

(3) In the aspect stated in the above (1) or (2), the perpendicular magnetic recording medium, in which the thickness of the first underlayer may be 0.2 nm to 5 nm.

(4) According to an aspect of the present invention there is provided a magnetic recording and reproducing apparatus including the perpendicular magnetic recording medium according to any one of the above (1) to (3), and a single magnetic pole head that writes information on the perpendicular magnetic recording medium.

According to the present invention, it is possible to provide a perpendicular magnetic recording medium in which, by forming an underlayer into a two-layered structure of a first underlayer made of a TiV alloy having an amorphous structure and a second underlayer made of a NiW alloy layer, the refinement, uniform size distribution, and improved orientation of crystal particles are achieved in an intermediate layer and a perpendicular, magnetic recording layer, formed on the underlayer, electromagnetic conversion characteristics are excellent, and high recording density can be achieved, and a magnetic recording and reproducing apparatus.

DETAILED DESCRIPTION OF THE INVENTION

Figure 1:
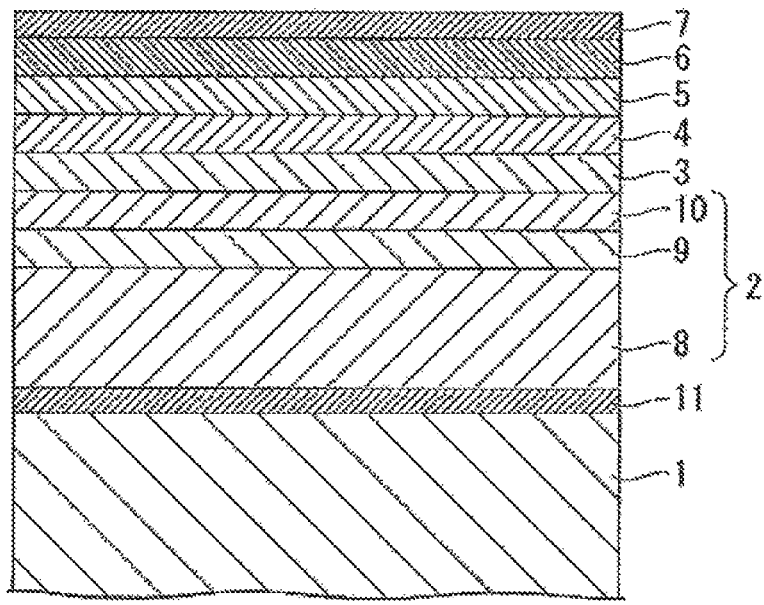
FIG. 1 is a cross-sectional view showing an example of a perpendicular magnetic recording medium to which the present invention is applied.

Hereinafter, a perpendicular magnetic recording medium and a magnetic recording and reproducing apparatus, to which the present invention is applied, will be described in detail with reference to the drawings.

In the drawings used in the description below, in order to provide an easier understanding of the features, there are cases in which featured portions are enlarged for convenience, and therefore the dimensional ratios or the like of the respective components will not necessarily reflect the actual size. Additionally, materials, dimensions, and the like that are provided in the following description are merely examples and the present invention is not limited thereto and can be modified and implemented within a range in which the effects of the present invention can be exhibited.

(Perpendicular Magnetic Recording Medium)

The perpendicular magnetic recording medium to which the invention is applied has a configuration, for example, as shown in FIG. 1, in which an adhesion layer 11, a soft magnetic backing layer 2, a first underlayer 3 (underlayer), a second underlayer 4 (underlayer), an intermediate layer 5, a perpendicular magnetic recording layer 6, and a protective layer 7 are sequentially laminated in this order on each of the two surfaces of a non-magnetic substrate 1, and a lubricant film (not shown in FIG. 1) is formed on the top layer. FIG. 1 shows only one surface of the non-magnetic substrate 1.

As the non-magnetic substrate 1, for example, a metal substrate made of a metallic material, such as aluminum or an aluminum alloy, or a non-metallic substrate made of a nonmetallic material, such as glass, ceramic, silicon, silicon carbide, or carbon, may be used.

In addition, as a glass substrate composing the non-magnetic substrate 1, for example, amorphous glass or crystalline glass can be used, and, furthermore, as the amorphous glass, soda lime glass, aluminosilicate glass, or the like can be used, which are commonly used. On the other hand, as the crystalline glass, lithium-based crystallized glass or the like can be used.

The non-magnetic substrate 1 preferably has an average surface roughness Ra of 0.8 nm or less, and preferably 0.5 nm or less from the viewpoint of increasing the recording density. In addition, the non-magnetic substrate 1 preferably has a fine wave (Wa) on the surface of 0.3 nm or less, and preferably 0.25 nm or less from the viewpoint that high recording density recording can be performed with a magnetic head slightly floated. As described above, by flattening the surface of the non-magnetic substrate 1, the contollability of the crystal orientations in the intermediate layer 5 and the perpendicular magnetic recording layer 6 is enhanced, the recording and reproducing characteristics are improved, and it becomes possible to perform recording with the head slightly floated.

In addition, since the non-magnetic substrate 1 is in contact with the soft magnetic backing layer 2 including Co or Fe as the main component as described below, corrosion may occur due to the influence of gas or moisture attached to the surfaces, the diffusion of substrate components, or the like. Therefore, it is preferable to provide the adhesion layer 11 between the non-magnetic substrate 1 and the soft magnetic backing layer 2. As a material for the adhesion layer 11, for example, it is possible to appropriately select Cr, a Cr alloy, Ti, a Ti alloy, or the like. In addition, the thickness of the adhesion layer 11 is preferably 2 nm or more, and is more preferably 30 nm or less.

The soft magnetic backing layer 2 has a structure in which a first soft magnetic film 8, a Ru film 9, and a second soft magnetic 10 are sequentially laminated. That is, the soft magnetic backing lay 2 has a structure in which the Ru film 9 is interposed between two soft magnetic films 8 and 10 an that the soft magnetic films 8 and 10 form an anti-ferro coupling (AFC) bonding on and below the Ru film 9. Thereby, it is possible to enhance the resistance against external magnetic fields and the resistance against oxide area tack erasure (WATE) phenomenon, which is an intrinsic problem of perpendicular magnetic recording.

The soft magnetic film 10 having an amorphous structure directly contacts the first underlayer 3, and the first underlayer 3 directly contacts the second underlayer 4.

The first and second soft magnetic films 8 and 10 include, for example, a CoFe alloy. By using a CoFe alloy for the soft magnetic films 8 and 10, it is possible to realize a high saturation magnetic flux density Bs (1.4 (T) or higher), and, by using the first underlayer 3 and the second underlayer 4, which will be described later, it is possible to obtain more excellent recording and reproducing characteristics. When the first and second soft magnetic films 8 and 10 are formed, it is preferable to form CoFe alloy films by a sputtering method in a state in which the magnetic field is applied in the radical direction of the non-magnetic substrate 1.

In addition, it is preferable to add any of Zr, Ta, and Nb to the CoFe alloy. Thus, it becomes possible to accelerate the process of the CoFe alloy becoming amorphous and improve the orientation of a NiW alloy. In addition, the amount of Zr, Ta, and Nb added to the CoFe alloy is preferably in a range of 3 atom % to 15 atom %, and is more preferably in a range of 5 atom % to 10 atom %.

The amount of Fe in the CoFe alloy is preferably in a range of 5 atom % to 60 atom %. When the amount of Fe is less than 5 atom %, the saturation magnetic flux density Bs of the soft magnetic backing layer 2 is decreased, which is not preferable. On the other hand, when the amount of Fe is more than 60 atom %, the corrosion resistance of the soft magnetic backing layer 2 is deteriorated, which is not preferable.

The thickness of the soft magnetic backing layer 2 is preferably in a range of 15 nm to 80 nm, and is more preferably in a range of 20 nm to 50 nm. When the thickness of the soft magnetic backing layer 2 is less than 15 nm, it is not possible to sufficiently absorb magnetic fluxes from the magnetic head so that data cannot be written sufficiently, and thus the recording and reproducing characteristics are deteriorated, which is not preferable. On the other hand, when the thickness of the soft magnetic backing layer 2 is more than 80 nm, the productivity is significantly decreased, which is not preferable.

In addition, in the soft magnetic backing layer 2, by forming an amorphous structure in the first and second soft magnetic films 8 and 10, it is possible to prevent the surface roughness Ra from coarsening. Thus, it becomes possible to reduce the degree of floating of the magnetic head, and thus it becomes possible to achieve a higher recording density.

Here, when "Hbias" is defined as an index indicating the degree of the AFC bonding in the first and second soft magnetic films 8 and 10 which constitutes the soft magnetic backing layer 2, the soft magnetic backing layer 2 preferably has a value of Hbias of 80 (Oe) or more and more preferably 300 (Oe) or less. Thus, it is possible to increase the external magnetic field resistance and the WATE resistance. In the "Hbias," since the saturation magnetic flux density is defined as Ms, and a magnetic field with a half value of the saturation magnetic flux density Ms is defined as Ms/2, it is possible to satisfy the above value of Hbias by using the above materials for the first and second soft magnetic films 8 and 10 so that the thickness of the Ru film 9 provided between the soft magnetic films 8 and 10 is made to have a predetermined thickness example, 0.6 nm to 0.8 nm).

In addition, the first and second soft magnetic films 8 and 10 preferably have a Hbias of 10 (Oe) or less, and more preferably have a Hbias of 5 (Oe) or less. 1 (Oe) is about 79 A/m.

The first underlayer 3 and the second underlayer 4 are provided to control the orientations and crystal sizes of the intermediate layer 5 and the perpendicular magnetic recording layer 6 provided thereon, and are provided to increase the perpendicular component of the magnetic flux generated from the magnetic head to the substrate surface and to further strongly fix the orientation of the magnetization in the perpendicular magnetic recording layer 6, on which information is recorded, in a direction perpendicular to the non-magnetic substrate 1. That is, the reason why it is difficult to achieve a perpendicular orientation in the magnetic recording layer even when the intermediate layer and the magnetic recording layer are provided directly on the second soft magnetic film is that the second soft magnetic film 10 has an amorphous structure.

Since a NiW alloy is used for the underlayer, it is possible to form a perpendicular magnetic recording layer by growing hcp-structured magnetic particles having a high tendency of orientating along the c axis on the underlayer (refer to to Japanese Unexamined Patent Application, First Publication No. 2007-179598). As a result of studying how to achieve the additional refinement of the crystal grains, the uniform size distribution of the crystal grains, and improved orientation of the crystal grains in the perpendicular magnetic recording layer in addition to the improvement in the underlayer made of a NiW alloy, the present inventors have found that the above can be realized by forming the underlayer into a two-layered structure of a TN alloy layer having an amorphous structure and a NiW alloy layer sequentially provided from the substrate side.

In the related art, there has been an attempt to achieve crystal refinement in the NiW layer by providing a fine crystal layer having an fcc structure or the like between the soft magnetic backing layer having an amorphous structure and the NiW underlayer. However, there is a limitation in the attempt and there arises a problem that the controllability of the orientation of the intermediate layer to be formed on the NiW layer is deteriorated if the crystal grains of the NiW layer are excessively refined. This is because, if the fine crystal layer is excessively refined, the crystallinity of the fine crystal layer is deteriorated, which causes a decrease in the crystallinity of the NiW layer according to the study of the present inventors.

The present inventors have studied to provide a layer having an amorphous structure as a layer under the NiW underlayer. It has been conceived that the layer having an amorphous structure is a layer for forming the nucleus into an island shape and the nucleus makes the respective NiW crystals grow one by one and thus the lamination structure of the present invention has been completed.

In the present invention, a layer made of a TiV alloy is used as the first underlayer. The amount of V included in the TiV alloy is preferably in a range of 10 atom % to 80 atom %. That is, in the case where a lay made of a TiV alloy is used as the first underlayer, by setting the amount of V to be in a range of 10 atom % to 80 atom %, it is possible to achieve refinement of the crystal grains of the underlayer using a NiW alloy and high crystal orientation.

The lower limit of the amount of V included in the TiV alloy is preferably 10 atom % or more and more preferably 30 atom % or more. In addition, the upper limit of the amount of V included in the TiV alloy is preferably 80 atom % or less and is more preferably 70 atom % or less.

A known method can be adopted to form an amorphous structure in the TiV alloy layer which is the first underlayer of the present invention. For example, in the case of using a sputtering method for film formation, methods of lowering the temperature of the substrate at the time of film formation, reducing the energy of sputter particles, decreasing plasma density by reducing the supply of power to a target, and disturbing a crystal structure of a film by conducting inverse spattering after film formation can be adopted.

As described above, it is possible to realize the perpendicular magnetic recording medium in which, by improving the crystal structure of the second underlayer 4 made of a NiW alloy, the refinement, uniform size distribution, and improved orientation of crystal particles are achieved in the intermediate layer 5 and the perpendicular magnetic recording layer, further laminated on the second underlayer, electromagnetic conversion characteristics are excellent, and a high recording density can be achieved.

The thickness of the first underlayer 3 is preferably in a range of 0.2 nm to 5 nm. When the thickness of the first underlayer 3 is less than 0.2 nm, the effects of the present invention are not sufficiently exhibited and the effect of refining the crystal grains of the NiW alloy layer of the second underlayer and making the crystal grain size uniform is deteriorated. On the other hand, when the thickness of the first underlayer 3 is more than 5 nm, the crystal size of the second underlayer 4 is increased, which is not preferable.

In the present invention, the second underlayer 4 is composed of a NiW alloy The amount of W in the NiW alloy is preferably in a range of 3 atom % to 10 atom %.

When the amount of W in the NiW alloy is less than 3 atom % or more than 10 atom %, the effect of controlling the orientation and crystal size of the perpendicular magnetic recording medium is deteriorated, which is not preferable.

Meanwhile, for the purpose of reducing the crystal sizes and increasing the consistency with crystal lattice sizes of the intermediate layer 5, it is possible to add other elements to the NiW alloy. For example, for the purpose of reducing the crystal sizes, B, Mn, or the like may be added, and, in this case, the amount of B and Mn is preferably 6 atom % or less, and is more preferably 1 atom % or more. In addition, for the purpose of increasing the consistency with crystal lattice sizes of the intermediate layer 5, it is possible to add Ru, Pt, Mo, Ta, or the like. In this case, the amount of Ru, Pt, Mo, and Ta is preferably 1 atom % to 40 atom %.

The thickness of the second underlayer 4 is preferably in a range of 2 nm to 20 nm. When the thickness of the second underlayer 4 is less than 2 nm, the effect is not sufficiently exhibited and the effect of refining the crystal grain size cannot be obtained. In addition, the orientation is deteriorated and thus this case is not preferable. On the other hand, when the thickness of the second underlayer 4 is more than 20 nm, the crystal size is increased, which is not preferable.

The intermediate layer 5 is a layer for forming the perpendicular magnetic recording layer into columnar crystals oriented along the c axis, and the growth surface has a dome shape. Such an intermediate layer 5 can be formed by including Ru or a Ru alloy. Examples of the Ru alloy can include a RuCo alloy, a RuAl alloy, a RuMn alloy, a RuMo alloy and a RuFe alloy. The amount of Ru in the Ru alloy is preferably 50 atom % to 90 atom %.

The thickness of the intermediate layer 5 is 30 nm or less, is preferably 5 nm or more and is preferably 16 nm or less. When the thickness of the intermediate layer 5 is thin, the distance between the magnetic head and the soft magnetic backing layer 2 is shortened, and thus it is possible to make the magnetic flux from the magnetic head steep. As a result, it is possible to further reduce the thickness of the soft magnetic backing layer 2, and thus it becomes possible to improve productivity.

The perpendicular magnetic recording layer 6 is made of magnetic films in which the axes of easy magnetization are aligned in the perpendicular direction to the substrate surface. The perpendicular magnetic recording layer 6 includes at least Co and Pt, and an oxide or Cr, B, Cu, Ta, Zr, or the like may be further added for the purpose of improving SNR characteristics. Examples of the oxide can include $SiO_2$, SiO, $Cr_2O_3$, CoO, $Ta_2O_3$, $TiO_2$, or the like.

The volume fraction of the oxide in the perpendicular magnetic recording layer 6 is preferably 15 volume % to 40 volume %, and is more preferably 25 volume % to 35 volume %. When the volume fraction of the oxide is less than 15 volume %, the SNR characteristics become insufficient, which is not preferable. On the other hand, when the volume fraction of the oxide is more than 40 volume %, it is not possible to obtain a enough coercive force to respond to the high recording density, which is not preferable.

The thickness of the perpendicular magnetic recording layer 6 is preferably in a range of 6 nm to 20 nm. For example, when the thickness of an oxide granular layer is within the above range, a sufficient output can be secured, and no deterioration of OW characteristics occurs, which is preferable.

The perpendicular magnetic recording layer 6 can have a single-layer structure or a structure of two or more layers made of materials of different compositions.

The protective layer 7 is provided to prevent the corrosion of the perpendicular magnetic recording layer 6, and also to prevent damage to the medium surface when the magnetic head comes into contact with the medium. A material including a well-known material of the related art, for example, C, SiO2, or ZrO2 can be used. The thickness of the protective layer 7 is desirably within a range of 1 nm to 5 nm from the viewpoint of a high recording density, since the distance between the magnetic head and the medium surface can be reduced.

For the lubricant film coated on the top layer, a well-known material of the related art, for example, perfluoropolyether, fluorinated alcohol, fluorinated carboxylic acid, or the like can be used.

(Magnetic Recording and Reproducing Apparatus)

Figure 2:
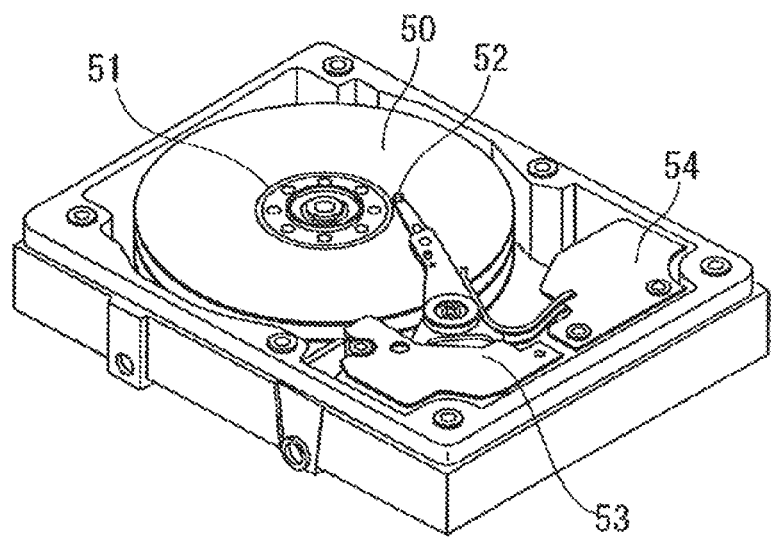
FIG. 2 is a perspective view showing an example of a magnetic recording and reproducing apparatus to which the present invention is applied.

FIG. 2 is a view showing an example of a magnetic recording and reproducing apparatus to which the present invention is applied.

The magnetic recording and reproducing apparatus includes a perpendicular magnetic recording medium 50 having the configuration shown in FIG. 1, a medium driving section 51 that drives the perpendicular magnetic recording medium 50 in a rotary manner, a magnetic head 5 that records and reproduces information on the perpendicular magnetic recording medium 50, a head driving section 53 that moves the magnetic head 52 relative to the perpendicular magnetic recording medium 50, and a recording and reproducing signal processing section 54. In addition, the recording and reproducing signal processing section 54 can process data which is input from the outside, then transmit a recording signal to the magnetic head 52, process a reproducing signal from the magnetic head 52, and then transmit data outside.

In the magnetic recording and reproducing apparatus to which the present invention is applied, in order to satisfy the demand for achieving a higher recording density of the perpendicular magnetic recording medium, a single magnetic pole head that is excellent in terms of a data-writing capability on the perpendicular magnetic recording layer 6 is used as the magnetic head 52. In the perpendicular magnetic recording medium, in order to support such a single magnetic pole head, the soft magnetic backing layer 2 is provided between the non-magnetic substrate 1 and the perpendicular magnetic recording layer 6 so as to improve the efficiency of the transportation of magnetic fluxes between the single magnetic pole head and the perpendicular magnetic recording layer 6.

In addition, in the magnetic recording and reproducing apparatus, it is possible to use the magnetic head 52 which has, as a reproducing element, a giant magnetoresistance (GMR) element or the like with the GMR effect and is more suitable for a higher recording density.

The present invention is not necessarily limited to the above embodiments, and a variety of modifications can be added within a range in which the effects of the present invention can be exhibited.

For example, the present invention can also be applied to a perpendicular magnetic recording medium in which the perpendicular magnetic recording layer 6 has a magnetic recording pattern which has been magnetically separated. Specifically, as a magnetic recording medium having a magnetic recording pattern, so-called patterned media, in which a magnetic recording pattern is arranged with a specific regularity for each bit, media in which a magnetic recording pattern is arranged in a track shape, media having a servo signal pattern, or the like can be used.

EXAMPLES

Hereinafter, the effects of the present invention will be further-clarified using examples. The present invention is not limited to the examples below and can be appropriately modified within the scope of the invention for practical use.

In the example, first, as a non-magnetic substrate, a glass substrate (having a diameter of 2.5 inches) was placed in the forming chamber of a DC magnetron sputter (C-3010, manufactured by Anelva Corporation), and the film forming chamber was exhausted until the degree of vacuum reached $1 \times 10^{-5}$ Pa. On the glass substrate, an adhesion layer having a thickness of 10 nm and including 50Cr-50Ti. (the amount of Cr was 50 atom %, and the amount of Ti was 50 atom %), a first soft magnetic film having a thickness of 20 nm, a Ru film having a thickness of 0.8 nm, and including 47Fe-35Co-9W-9Nb (the amount of Fe was 47 atom %, the amount of Co was 35 atom %, the amount of W was 9 atom %, and the amount of Nb was 9 atom %), a second soft magnetic film having a thickness of 20 nm and including 47Fe-35Co-9W-9Nb were formed so as to form a soft magnetic backing layer. It was confirmed by XRD that the crystal structures of the soft magnetic films were an amorphous structure.

Next, on the soft magnetic backing layer, a first underlayer having a thickness of 1 nm and having each composition and each crystal structure shown in Table 1 was formed, and on the first underlayer, a second underlayer having a thickness of 3 nm and made of a NiW alloy was formed. In Comparative Examples 1 to 3, by applying a bias voltage of 150 V to the substrate when the first underlayer was formed by the sputtering method, the first underlayer was crystallized.

On the second underlayer, an intermediate layer having a thickness of 12 nm and made of Ru was formed and as a perpendicular magnetic recording layer, a 69Co-5Cr-16Pt-10SiO$_2$ layer having a thickness of 10 nm and a 53Co-10Cr-23Pt-14B layer having a thickness of 6 nm were formed. On the perpendicular magnetic recording layer, a protective layer having a thickness of 4 nm and made of carbon was formed by the ion beam method, and then a lubricant layer made of perfluoropolyether was formed by the dipping method, thereby obtaining a perpendicular magnetic recording medium of each of Examples 1 to 10.

Regarding the perpendicular magnetic recording mediums in Examples 1 to 10 and Comparative Examples 1 to 4, in order to investigate electromagnetic conversion characteristics, the signal to noise ratio (SNR) was evaluated. The evaluation results are shown in Table 1.

In addition, the substrate on which the intermediate layer made of Ru in each of Examples was formed was taken out from a film forming apparatus and a perpendicular orientation of Ru ($\Delta\theta 50$) was investigated. The evaluation results are shown in Table 1.

TABLE 1

| | First underlayer | | | Electromagnetic conversion |
|---|---|---|---|---|
| | Composition | Crystal structure | Ru $\Delta\theta 50$ (°) | characteristics SNR (db) |
| Comparative Example 1 | Ti | hcp | 2.85 | 19.10 |
| Comparative Example 2 | Ti | Amorphous | 2.77 | 19.30 |
| Example 1 | 95Ti5V | Amorphous | 2.76 | 19.50 |
| Example 2 | 90Ti10V | Amorphous | 2.74 | 19.52 |
| Example 3 | 82Ti18V | Amorphous | 2.73 | 19.52 |
| Example 4 | 70Ti30V | Amorphous | 2.71 | 19.53 |
| Example 5 | 60Ti40V | Amorphous | 2.70 | 19.54 |
| Example 6 | 50Ti50V | Amorphous | 2.70 | 19.55 |
| Example 7 | 35Ti65V | Amorphous | 2.72 | 19.54 |
| Example 8 | 25Ti70V | Amorphous | 2.72 | 19.53 |
| Example 9 | 20Ti80V | Amorphous | 2.75 | 19.51 |
| Example 10 | 10Ti90V | Amorphous | 2.76 | 19.48 |
| Comparative Example 3 | V | bcc | 2.89 | 19.02 |
| Comparative Example 4 | 82Ti18V | bcc | 2.83 | 19.23 |

When comparing Examples 1 to 10 to Comparative Examples 1 to 4 in Table 1, the SNRs of all of Examples 1 to 10 are excellent compared to the SNR of Comparative Examples 1 to 4. Particularly, it was found that in Comparative Examples 1 to 3 which had different crystal structures from the crystal structures of Examples 1 to 10, and included only a Ti element or a V element in the first underlayer, the SNR was about 0.4 dB to 0.5 dB lower than Examples 1 to 10.

When comparing Example 1 and Comparative Example 2, the crystal structures have the same amorphous structure but the Ti element s changed to a TiV alloy containing 5 atom % of V, thereby improving the SNR by 0.2 dB. When comparing Examples 1 to 6, it was found that as the amount of V was further increased until reaching 50 atom %, the SNR become more satisfactory.

On the other hand, when comparing Comparative Example 3 and Examples 6 to 10, it was found that in a case in which the material for the first underlayer was a V element and the crystal structure was bcc (Comparative Example 3), the SNR was 19.02 dB but as the amount of V in an amorphous TiV alloy was reduced from 90 atom % to 50 atom %, the SNR become more satisfactory.

In addition, when comparing Example 3 and Comparative Example 4, it was found that although the perpendicular magnetic recording medium had the same composition, in a case in which the crystal structure was not amorphous, the SNR was as low as about 0.3 dB.

In addition, when comparing Examples 1 to 10, it was found that for the material of the first underlayer, a material having an amount of V in a TiV alloy of 10 atom % or more and 80 atom % or less and a SNR of 19.51 dB or more was preferable and that a material having an amount of V of 30 atom % to 70 atom % and a SNR of 19.53 db or more was more preferable.

Further, when comparing Examples 1 to 10 and Comparative Examples 1 to 4, it was found that the perpendicular orientation of Ru ($\Delta\theta 50$) in all of Examples was more satisfactory compared to Comparative Examples 1 to 4.

EXPLANATION OF REFERENCES

1 . . . NON-MAGNETIC SUBSTRATE, 11 . . . ADHESION LAYER, 2 . . . SOFT MAGNETIC BACKING LAYER, 3 . . . FIRST UNDERLAYER, 4 . . . SECOND UNDERLAYER, 5 . . . INTERMEDIATE LAYER, 6 . . . PERPENDICULAR MAGNETIC RECORDING LAYER,

7 ... PROTECTIVE LAYER, 8 ... FIRST SOFT MAGNETIC FILM, 9 ... Ru FILM, 10 ... SECOND SOFT MAGNETIC FILM, 50 ... PERPENDICULAR MAGNETIC RECORDING MEDIUM, 51 ... MEDIUM DRIVING SECTION, 52 ... MAGNET HEAD, 53 ... HEAD DRIVING SECTION, 54 ... RECORDING AND REPRODUCING SIGNAL PROCESSING SECTION

What is claimed is:

1. A perpendicular magnetic recording medium comprising a structure in which at least a soft magnetic backing layer, an underlayer, an intermediate layer, and a perpendicular magnetic recording layer are sequentially laminated on a non-magnetic substrate;
wherein the soft magnetic backing layer includes at least a soft magnetic film having an amorphous structure,
the underlayer includes a first underlayer and a second underlayer laminated in this order from the non-magnetic substrate side,
the first underlayer is made of a TiV alloy having an amorphous structure, wherein the TiV alloy consists of Ti and V,
the second underlayer includes a NiW alloy,
the intermediate layer includes Ru or a Ru alloy,
the soft magnetic film having an amorphous structure directly contacts the first underlayer, and the first underlayer directly contacts the second underlayer.

2. The perpendicular magnetic recording medium according to claim 1, wherein the amount of V included in the TiV alloy is 10 atom % to 80 atom %.

3. The perpendicular magnetic recording medium according to claim 1, wherein the thickness of the first underlayer is 0.2 nm to 5 nm.

4. A magnetic recording and reproducing apparatus comprising:
the perpendicular magnetic recording medium according to claim 1; and
a single magnetic pole head that writes information on the perpendicular magnetic recording medium.

5. The perpendicular magnetic recording medium according to claim 2, wherein the amount of V included in the TiV alloy is 30 atom % or more.

6. The perpendicular magnetic recording medium according to claim 2, wherein the amount of V included in the TiV alloy is 70 atom % or less.

7. The perpendicular magnetic recording medium according to claim 1, wherein the non-magnetic substrate is made of a compound selected from the group consisting of aluminum, aluminum alloy, glass, ceramic, silicon, silicon carbide and carbon.

* * * * *